(12) United States Patent
Cooper (10) Patent No.: US 7,773,152 B2
(45) Date of Patent: Aug. 10, 2010

(54) METHOD, SYSTEM, AND PROGRAM PRODUCT FOR ELIMINATING ERROR CONTRIBUTION FROM PRODUCTION SWITCHERS WITH INTERNAL DVES

(75) Inventor: J. Carl Cooper, Los Gatos, CA (US)

(73) Assignee: Pixel Instruments Corporation, Los Gatos, CA (US)

( * ) Notice: Subject to any disclaimer, the term of this patent is extended or adjusted under 35 U.S.C. 154(b) by 186 days.

(21) Appl. No.: 12/015,460

(22) Filed: Jan. 16, 2008

(65) Prior Publication Data

US 2008/0129872 A1    Jun. 5, 2008

Related U.S. Application Data

(63) Continuation of application No. 10/846,069, filed on May 14, 2004, now Pat. No. 7,333,150.

(51) Int. Cl.
*H04N 9/475* (2006.01)
*H04N 5/073* (2006.01)

(52) U.S. Cl. .......... 348/515; 348/512; 348/518; 348/452.4

(58) Field of Classification Search .......... 348/515, 348/512, 518, 578, 598, 425.4; 375/240.28
See application file for complete search history.

(56) References Cited

U.S. PATENT DOCUMENTS 5,751,368 A * 5/1998 Cooper .......... 348/512

* cited by examiner

*Primary Examiner*—David L Ometz
*Assistant Examiner*—Jean W Désir
(74) *Attorney, Agent, or Firm*—Stevens Law Group; David R. Stevens (57) ABSTRACT

Measurement of the relative timing between images and associated information, for example video and audio. Image mutual event characteristics are recognized in the images and associated mutual event characteristics are recognized in the associated information. The image mutual events and associated mutual events are compared to determine their occurrences, one relative to the other as a measure of relative timing. Particular operation with audio and video signals is described.

25 Claims, 5 Drawing Sheets

"Prior Art"

METHOD, SYSTEM, AND PROGRAM PRODUCT FOR ELIMINATING ERROR CONTRIBUTION FROM PRODUCTION SWITCHERS WITH INTERNAL DVES

RELATED APPLICATIONS

This application is a continuation of application Ser. No. 10/846,069 filed on May 14, 2004.

BACKGROUND OF INVENTION

1. Field of the Invention

The invention relates to the creation, manipulation, transmission, storage, and especially synchronization of multimedia entertainment, educational and other programming having at least video and associated information. The invention will find particular use with respect to the creation and distribution of television programs.

2. Background Art

The creation, manipulation, transmission, storage, etc. of multi-media content, be it entertainment, educational, scientific, business, and other programming having at least video and associated information requires synchronization. Typical examples of such programming are television and movie programs, motion medical images, and various engineering and scientific content. These are collectively referred to as "programs."

Often these programs include a visual or video portion, an audible or audio portion, and may also include one or more various data type portions. Typical data type portions include closed captioning, narrative descriptions for the blind, additional program information data such as web sites and further information directives and various metadata included in compressed (such as for example MPEG and JPEG) systems.

Often the video and associated signal programs are produced, operated on, stored or conveyed in a manner such that the synchronization of various ones of the aforementioned audio, video and/or data is affected. For example the synchronization of audio and video, commonly known as lip sync, may be askew when the program is produced. If the program is produced with correct lip sync, that timing may be upset by subsequent operations, for example such as processing, storing or transmission of the program.

One aspect of multi-media programming is maintaining audio and video synchronization in audio-visual presentations, such as television programs, for example to prevent annoyances to the viewers, to facilitate further operations with the program or to facilitate analysis of the program.

The video and audio signals in a television system are increasingly being subjected to more and more steps of digital processing. Each step has the potential to add a different amount of delay to the video and audio, thereby introducing a lip sync error. Incorrect lip sync is a major concern to newscasters, advertisers, politicians and others who are trying to convey a sense of trust, accuracy and sincerity to their audience. Studies have demonstrated that when lip sync errors are present, viewers perceive a message as less interesting, more unpleasant, less influential and less successful than the same message with proper lip sync.

Figure 1:
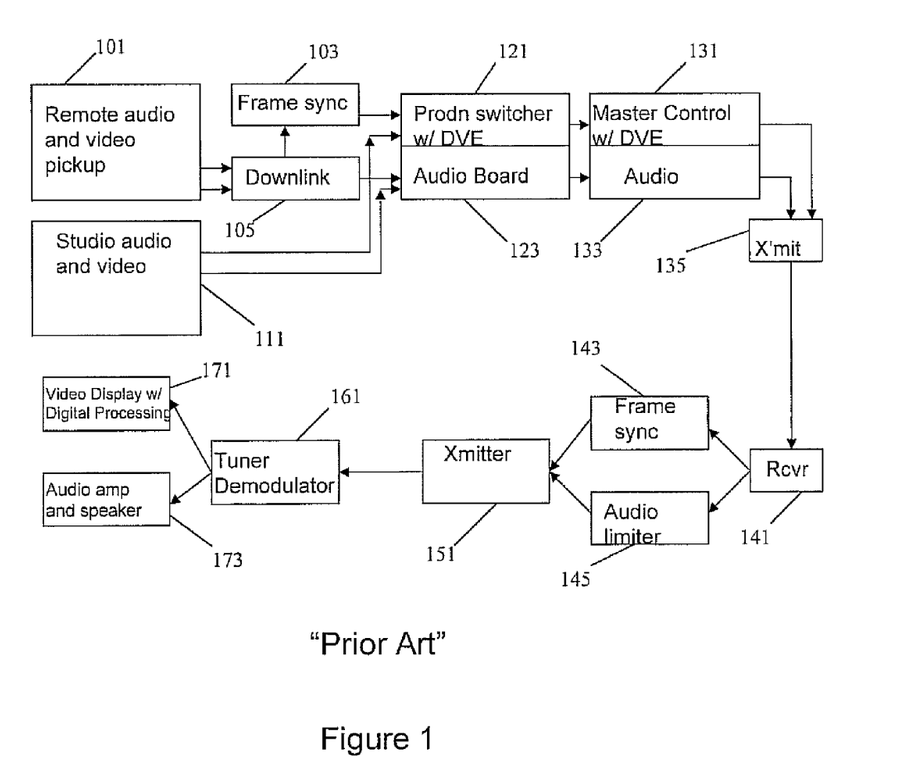
FIG. 1 illustrates a typical train of prior art processes and units to go from a multi-media pickup, through pre-transmission level processing, transmission, receiving, and receiver level processing (including tuning and demodulation) to final presentation to an end user or viewer.

Because light travels faster than sound, we are used to seeing events before we hear them—lightning before thunder, a puff of smoke before a cannon shot and so on. Therefore, to some extent, we can tolerate "late" audio. Unfortunately, as shown in FIG. 1, even in a simple television system, the video is almost always delayed more than the audio, creating the unnatural situation of "early" audio. Any one contributor to the lip sync error may or may not be noticeable. But the cumulative error from the original acquisition point to the viewer can easily become both noticeable and objectionable. The potential for lip sync errors increases even further when MPEG compressed links are added to one or more stages of the overall system.

As shown in a typical television FIG. 1, as video moves from video pickup devices, typically CCD cameras, 101 and 111, to frame synchronizers, 103, production switchers, 121, digital video effects, 121 and 131, noise reducers and intermediate transmitters, 135, and receivers, 141, including MPEG encoders and decoders, more frame syncronizers 143, local transmitters, 151, tuners and demodulators, 161, and TVs with digital processing, 171 and the like, and as the audio goes from remote and studio pickup, 101 and 111, to an audio board, 123, further audio processing, 133, intermediate transmitters, 135, and receivers, 141, through audio limiters, 145, and local transmitters, 151, to a tuner-demodulator, 161 and an audio amplifier and speaker, 173, the video is delayed more than the audio. The cumulative delay of the video with respect to the audio can be 6 or more frames. With the inclusion of video and audio compression in any part(s) of the system the video delays with respect to audio can be much more. Worse yet, the amount of video delay frequently jumps by a frame or more as the operating mode changes, or as frames of video are dropped or repeated to achieve synchronization of the video to studio and other references. Using a fixed audio delay to "mop up" the audio to video timing errors is rarely a satisfactory solution because of the constantly changing video delay.

While not shown in this typical system of FIG. 1, data is frequently carried along with the video signals through much of the system, via separate paths, thus when the video is delayed as described above, the timing of the data relative to the video is disrupted.

Using a fixed data delay to "mop up" the data to video timing errors is rarely a satisfactory solution because of the constantly changing video delay Standards committees in various countries have studied the lip sync problem and have set guidelines for the maximum allowable errors. For the most part, these studies have determined that lip sync errors become noticeable to most viewers if the audio is early by more than 25-35 milliseconds (about 1 NTSC frame) or late by more than 80-90 milliseconds (2.5-3.0 NTSC frames). In June of 2003, the Advanced Television Systems Committee (ATSC) issued a finding that stated " . . . at the inputs to the DTV encoding device . . . the sound program should never lead the video program by more than 15 milliseconds, and should never lag the video program by more than 45 milliseconds." The finding continued "Pending [a finding on tolerances for system design], designers should strive for zero differential offset throughout the system." In other words, it is important to eliminate or minimize the errors at each stage where they occur, instead of allowing them to accumulate.

Fortunately, the "worst case" condition in FIG. 1 is now less likely to present itself than was the case a few years ago. Firstly, it is now quite common to install audio tracking delays, exemplified by the Pixel Instruments AD-3000 or AD-3100, alongside each video frame synchronizer or other video delay devices having delay signal outputs, thereby eliminating at least one common source of variable lip sync errors. The AD-3000 and AD-3100 variable audio delays are available from Pixel Instruments Corp. of Los Gatos, Calif.

Secondly, due to the continuing cost effectiveness of digital electronics, newer master control switchers have an internal DVE for squeezeback operation rather than an external DVE.

This allows the use of a constant insertion delay of 1 frame for both the video and the audio paths in all modes of operation.

Unfortunately, again due to the continuing cost effectiveness of digital electronics, newer master control switchers are now incorporating built in video frame synchronizers, scan converters and other video delaying circuitry.

Since the 1970s, digital video effects processors (DVEs or transform engines) have been used to produce "over the shoulder", "double box" and other multiple source composited effects. The video being transformed is delayed (usually by one or more frames) relative to the background video in the switcher. So, any time one or more DVE processors are on-air, the associated video sources will be delayed, resulting in a lip sync error. In the past, when the DVE processor was external to the switcher, a tally signal from the switcher could be used to trigger the insertion of a compensating audio delay when the DVE in on-air. However, today's production switchers are usually equipped with internal DVEs and a tally output is no longer available.

Thus, a need exists for a method, system, and program product for producing time synchronized multi-media signals.

SUMMARY OF THE INVENTION

The present invention provides for method of producing time synchronized multi-media signals.

The preferred embodiment of the present invention is a method, apparatus (system), and program product where audio and video portions of multi-media content, e.g., a television or other program, may be synchronized by inserting and controlling appropriate audio delays. This increases the apparent synchrony of the desired signals.

The method, system, and program product described herein provide for entering a delay value in the relative timing of a video signal conveying a plurality of images and an associated signal, as an audio signal. This is accomplished by a method, system and program product for producing time synchronized multi-media signals. This is done by inputting a start pulse, for example, a GPI Start pulse, a stop pulse, for example, a GPI Stop pulse, and a tally line for each video input. The next step is generating a Timer On/Off signal and a Time Value signal for each set of start pulses, stop pulse and tallies, and providing the Timer On/Off signal and a Time Value signals to a router. These outputs are properly associated with each other, processed and coupled to an audio synchronizer as one or more control signals, which in the preferred embodiment are a single signal of delay steering pulses for control of the delay of the audio signal.

One feature of the present invention is that the number of Interfaces and Tally contact closures can be stored in the timelines to control external devices. In other words, by use of the router, various combinations of input signals (tallies & GPIs) can be associated with the delay setting to create delay output signals. Since the video delay through the switcher is usually predictable (based on the combination of effects), an external interface can be used to interpret the GPI and tally outputs and generate the necessary steering commands to control audio synchronizers. This permits automatic correction of the lip sync errors. For example, the DG-1200 interface from Pixel Instruments can be preset to provide up to twelve different delays and can steer up to five audio synchronizers. Depending on the application, the insertion of the audio delay can be triggered by tally signals, GPIs, or a combination of both. Gating the tally signal with GPIs improves the immunity to false delay insertion.

For example, by way of illustration of the capabilities of the preferred embodiment of the invention, consider a simple video switcher system having two DVEs. The first DVE has a variable delay of 0-1.5 frames and the second DVE has a fixed delay of 2.25 frames. DVE 1 has a corresponding pair of GPI signals and a tally signal. DVE 2 has only an associated tally signal. For DVE 1 the GPI signals will indicate the current delay, that is the GPI start is triggered when a particular video frame enters DVE 1 and the GPI stop is triggered when that same particular video frame exits DVE 1. The associated tally is asserted when the output of DVE 1 is being utilized by the switcher. When the output of DVE 2 is being utilized by the switcher its associated tally is asserted. The DG-1200 will (as set up by an operator) receive the two tallies and two GPI signals as well as a 2.25 frame delay value. These signals and the delay value are utilized to create a delay output signal (DDO pulse) to control an audio synchronizer to cause the audio synchronizer delay to match the video delay of the production switcher as the two DVEs are inserted into (and taken out of) the video path. The two GPIs corresponding to DVE 1 are utilized to determine the current DVE 1 delay. The two tallies are used to determine if one or both DVEs are inserted into the video path. If DVE 1 is inserted (as determined by its corresponding tally), its delay (as determined by the GPIs) is added to the DDO signal. If DVE 2 is inserted (as determined by its corresponding tally) the 2.25 frame delay value is inserted into the DDO signal. Consequently the DDO may indicate 0 delay (neither DVE is used), the DVE 1 delay (DVE 1 is in use), a 2.25 frame delay (DVE 2 is in use) or a delay of 2.25 frames plus the DVE 1 delay (both DVEs are in use).

The preferred embodiment of the invention has the ability to utilize and configure its various inputs to match differing video systems. As just one of many possible examples, the GPIs may be utilized as an indicator of when a DVE is being used (as compared to indicating a varying delay as in the above example), or as an additional indicator along with the tally.

THE FIGURES

FIG. 3 illustrates a system for receiving video inputs through a video switcher with internal DVE's to generate GPI's and Tally signals, to an interface with a plurality of audio delays which system includes an embodiment of the present invention operable to generate delay steering pulses to an audio mixer, where the audio mixer provides a corrected audio output. Note that while FIG. 3 illustrates a typical system by way of example, one of ordinary skill will recognize that the teachings herein are applicable to general systems, methods and products wherein video signal processing causes changing video delays.

FIG. 4 illustrates video inputs and audio inputs with a video switcher with internal DVE's to generate GPI's and Tally signals, which system includes an embodiment of the present invention operable to generate a delay steering pulse to control a single audio delay operating on audio out of an audio mixer to provide a corrected audio output. Note that while FIG. 4 illustrates another typical system by way of example, one of ordinary skill will recognize that the teachings herein are applicable to general systems, methods and products wherein video signal processing causes changing video delays.

DETAILED DESCRIPTION OF THE INVENTION

The preferred embodiment of the invention produces time synchronized multi-media signals. This is done as one example by inputting a start pulse, for example, a GPI Start pulse, a stop pulse, for example, a GPI Stop pulse, and a tally line for each video input. The next step is for example generating a Timer On/Off signal and/or a Time Value signal for each set of start pulses, stop pulse and/or tallies, and providing the Timer On/Off signal and a Time Value signals to a router. The information conveyed by these signals are routed to an audio synchronizer as delay steering pulses for the audio signal.

The number of GPI and Tally assertions (typically contact closures) can be stored in these timelines to indicate system configuration and/or control external devices. Since the video delay through the switcher (or other system) is usually predictable (based on the combination of effects), an external interface of the present invention can be used to interpret these GPI and tally outputs and generate the necessary steering commands to control audio synchronizers. This permits automatic correction of the lip sync errors. An interface, such as the DG-1200 interface from Pixel Instruments can be preset to provide up to twelve different delays control signals (DDOs) and can steer up to five audio synchronizers. Depending on the application, the control of the audio delay can be triggered by tally signals, GPIs, or a combination of both. By utilizing the Control Router 531 which recognizes and couples desired ones of GPI and Tally input signals (for example via 511 and 521), Delay Time Values (for example 513 and 523) to the desired timer(s) (for example 541 and 551) one or more Delay Steering Signal may be generated to respond to the video system and reflect the current video delay of that system. Gating the tally signal with GPIs can be utilized to improve the immunity to false delay insertion. Multiple signals may be utilized in sequence or in tandem to improve reliability or to allow operation with simple or complex video systems.

Figure 2:
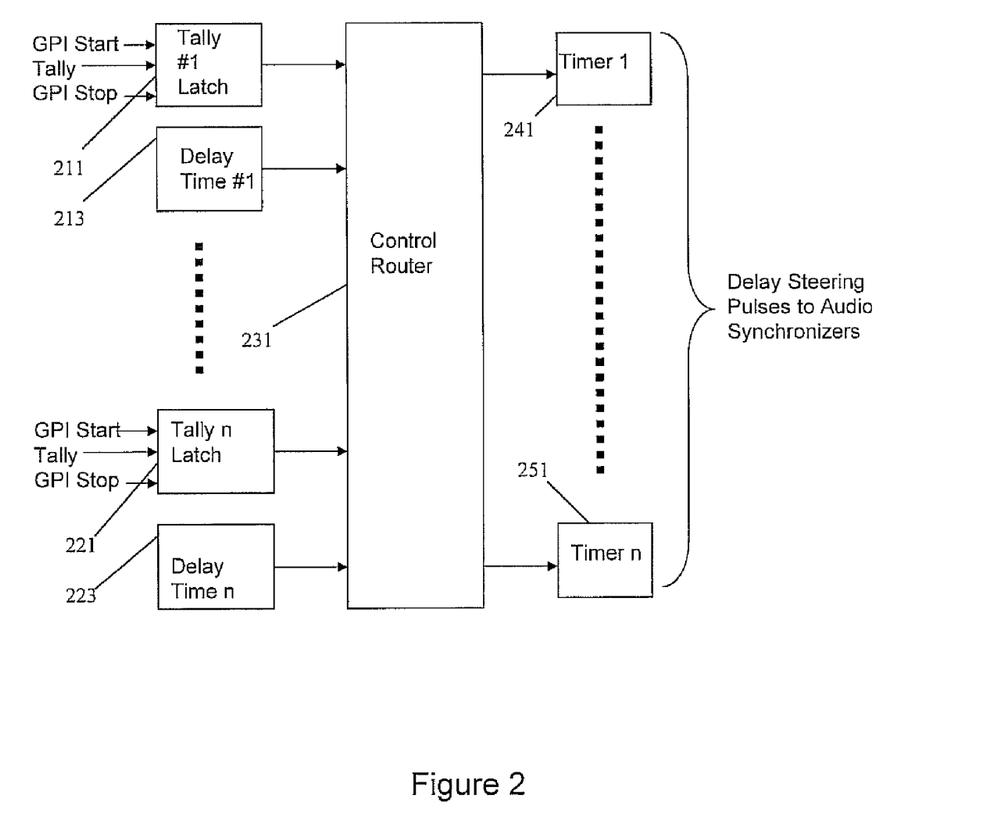
FIG. 2 shows a system for using General Program Interfaces and Tallies, through a control router, to timers, to generate delay steering pulses to an audio synchronizer.

FIG. 2 illustrates by way of example one preferred embodiment system where GPI start signals, Tally signals, and GPI stop signals are input to tally latches 211-221. The outputs of the Tally Latches, a timer on/off signals and time values, are input to a control router 231. Additionally, Delay Time values 213-223 are input to the control router. The control router 231 outputs desired ones of the On/Off and Time signals to individual timers 241-251, which in turn generate delay steering pulses which are suitably coupled to one or more audio synchronizers. The Tally Latch may be configured to respond to the input GPI Start, GPI Stop and Tally signals in various ways. It is preferred that the outputs of the Tally Latch may be configured (by operator or manufacture) to represent all of the possible Boolean and/or digital logic operations of the three input signals, however lesser numbers of the possible Boolean and/or digital logic operations may be utilized as desired.

Of particular interest are two combinations of digital logic and Boolean operation which will be described below.

The first combination of particular interest provides selectable inversion of each input, a selection of edge trigger or level trigger for the GPI inputs to control a set/reset flip flop function. The output of the set/reset function is anded by the tally signal and the output selectably inverted. This capability allows any input and output polarity. A delay time is established by setting the set/reset function with the GPI start (by edge or level trigger) and resetting with the GPI stop (by edge or level trigger). The resulting time duration (pulse) is counted to provide the established delay time which is coupled to the Control Router. In addition the set/reset pulse from the set/reset function itself is anded with the tally and the output coupled (in either polarity) to the Control Router. The Tally is coupled to the Control Router. In this fashion the inputs to the Control Router are 1) the Tally, 2) a pulse corresponding to the delay between GPI start and stop, 3) that pulse anded by the Tally. In addition a separate Delay Time Value established by manufacture or the operator is input to the Control Router. The Control Router may then couple various desired ones of its inputs to the desired timer to generate Delay Steering Signals (DDO Pulses). This combination is useful to measure a changing delay as provided by the timing of the GPI start and stop and the Tally is used to indicate when that changing delay is inserted in the video signal path. The changing delay can also be associated with the Delay Time Value from 213-223, for example added to it. This is useful for systems which have a fixed minimum delay to which a variable delay is added.

A second combination of interest provides a selection of edge trigger or level trigger for the GPI inputs to control a set/reset flip flop function. The output of the set/reset function is anded by the tally signal and the output selectably inverted. This capability allows any input and output polarity. The set/reset level from the set/reset function is anded with the tally and the output coupled (in either polarity) to the Control Router. In addition a separate Delay Time Value established by manufacture or the operator is input to the Control Router. The Control Router may then couple various desired ones of its inputs to the desired timer to generate Delay Steering Signals (DDO Pulses). This combination is useful for systems where GPI start and stop are used in addition to the Tally to indicate when a fixed delay is inserted in the video signal path.

The preferred embodiment ability to configure the Tally Latch, as well as the Control Router and Timers at taught herein is easily provided by configurable or programmable logic ICs, such as those manufactured by Altera and Xilinx, and operating under control of a suitable microprocessor, as is well known to those of ordinary skill in the art.

The aforementioned preferred embodiment of the second combination is available commercially in the previously mentioned DG-1200 which was introduced at the 2004 National Association of Broadcasters convention held Apr. 17-22, 2004 in Las Vegas, Nev. The DG-1200 is available from Pixel Instruments Corporation of Los Gatos, Calif.

As shown in FIG. 2 each of the twelve input channels consists of a GPI Start pulse, a GPI Stop pulse, 211 and 221, and a Tally line, 213 and 223. Each input channel also has a linked delay time register with a user selectable value from 20 μsec (nominally zero delay) up to 6.5 seconds, in increments of 100 μsec. Delay times can be entered and displayed in milliseconds or in TV fields (NTSC or PAL). Other configurations and values may be utilized as desired.

Any input channel and its time value (from either or both the Delay Time Value and the GPI determined delay time value) can be routed through a control router 231 to any of the output timers 241 and 251 and each timer can steer a separate audio synchronizer, as an AD-3100 Audio Synchronizer. The output timers, 241 and 251, can have different time values and can be turned on and off independently in response to the respective input signals. Also, any timer can be controlled by more than one input channel. Assume that one switcher effect needs a one frame audio delay and another effect needs a two frame audio delay. Input #1 (or any other input) can enable a 1 frame delay in Timer #3 (or any other timer) and the associated audio synchronizer, as an AD-3100. Any other input can be used to enable a 2 frame delay in the same timer.

Pre-Delayed Audio Application

Figure 3:
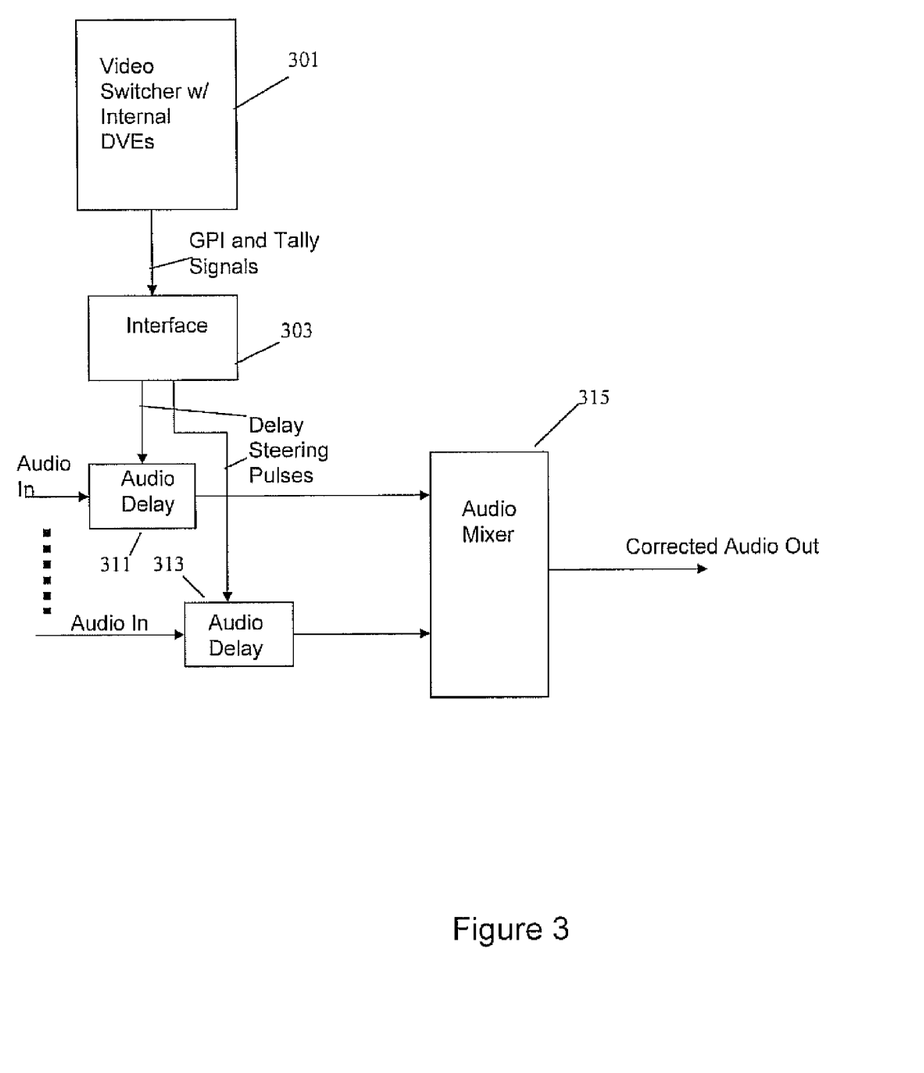

The most comprehensive solution is to add an audio synchronizer, as an AD-3100 Audio Synchronizers, ahead of the audio mixer 315 as shown in FIG. 3. This configuration of a video switcher with internal DVE's 301 generating GPI and tally signals, with the GPI and Tally signals as input to an interface 303 thereby generating delay steering pulses to audio delays 311 and 313, and the audio mixer 315. This provides a corrected audio output. This ensures that all sources contributing to the program output have the correct lip sync.

For applications that require more than 5 audio inputs to be delayed, this solution is scaleable with additional DG-1200s and AD-3100s.

Post-Delayed Audio Application

Figure 4:
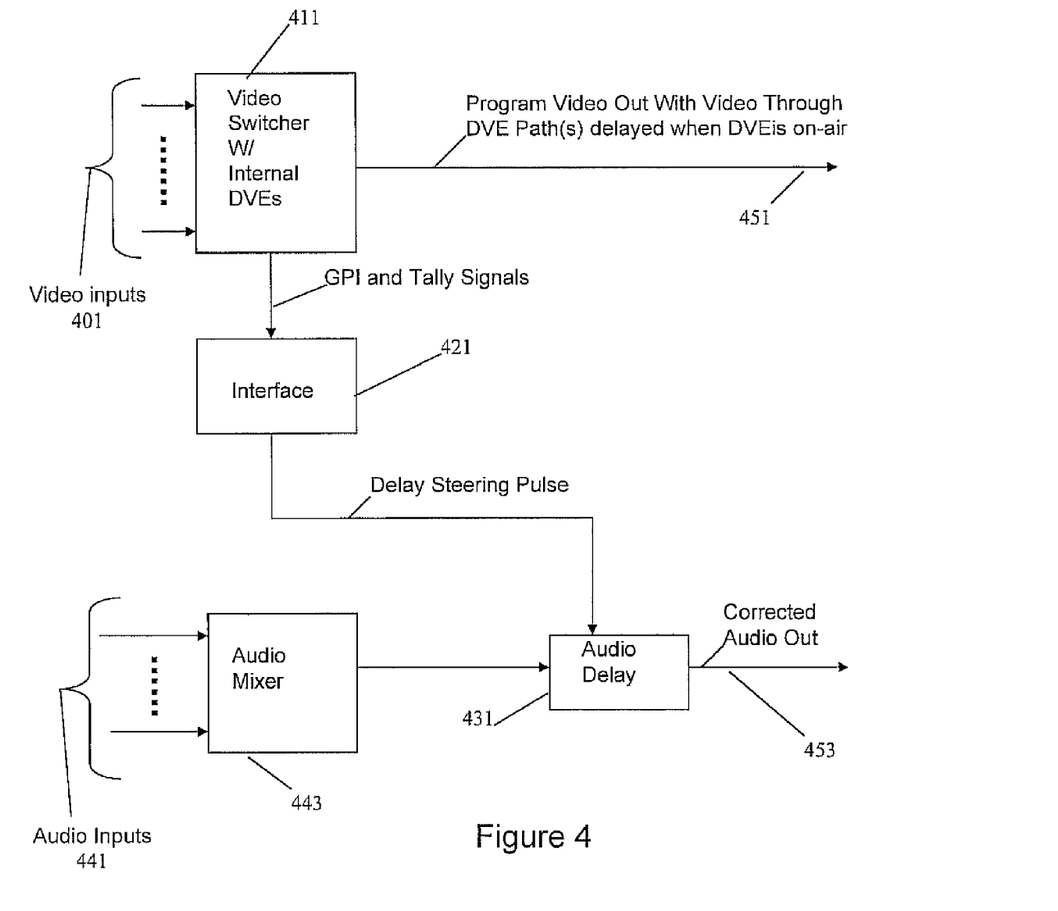

A simpler, but less comprehensive solution is shown in FIG. 4, where a single audio synchronizer, as an AD-3100 Audio Synchronizer is added at the output of the Audio Mixer. The amount of delay added to the audio path is chosen as a compromise for the various sources contributing to the program output in any given effect.

As shown in FIG. 4 video inputs are input to a video switcher with internal DVE's 411. This provides GPI and Tally signals output as input to an interface 421, which produces the audio delay steering pulses. The video switcher 411 also produces program video out with video through DVE paths delayed when a DVE is on the air. The output of the interface 421 is input to an audio delay 431, where, along with audio inputs 441 through an audio mixer 443 the delay steering pulse correction is applied to yield a corrected audio output 453.

For example, in a typical newscast over the shoulder shot, the studio anchor has zero video delay and the remote reporter (in the box) has one frame of video delay. Setting the audio synchronizer, for example, an AD-3100 Audio Synchronizer, delay to between 0 and 0.5 frame is the best compromise for both sources. The studio anchor's audio will be slightly late and the remote reporter's audio slightly early. The residual lip sync errors are reduced compared to doing nothing at all.

Rapid Delay Change with Pitch Correction

Since the video delay of the DVE may be switched in and out of the program path several times in a relatively short period, it is essential that the audio delay "catch up" quickly. Conventional audio synchronizers typically change their delay at a rate of 0.5% or less. This means that for each 1 frame increase or decrease in the video delay, the audio does not "catch up" for 10 seconds or more. In systems where the video delay changes at the start of a 15 second commercial, this would cause most or all of the commercial to suffer lip sync errors.

In a preferred exemplification, the audio synchronizer, as an AD-3100, incorporates automatic pitch correction to allow rapid delay change (up to 25%) without introducing undesirable artifacts such as pitch shifts, clicks and pops in the output. So, in our example of a one frame change in the video delay, the audio synchronizer will "catch up" in just a few frames. This is well before the viewer will notice.

The combination of a programmable tally/GPI interface and a fast tracking audio synchronizer provides a flexible cost effective solution to the lip sync errors introduced by production switchers and digital effects processors. It is also applicable to systems that use a master control switcher with external effects for squeezeback operation.

Figure 5:
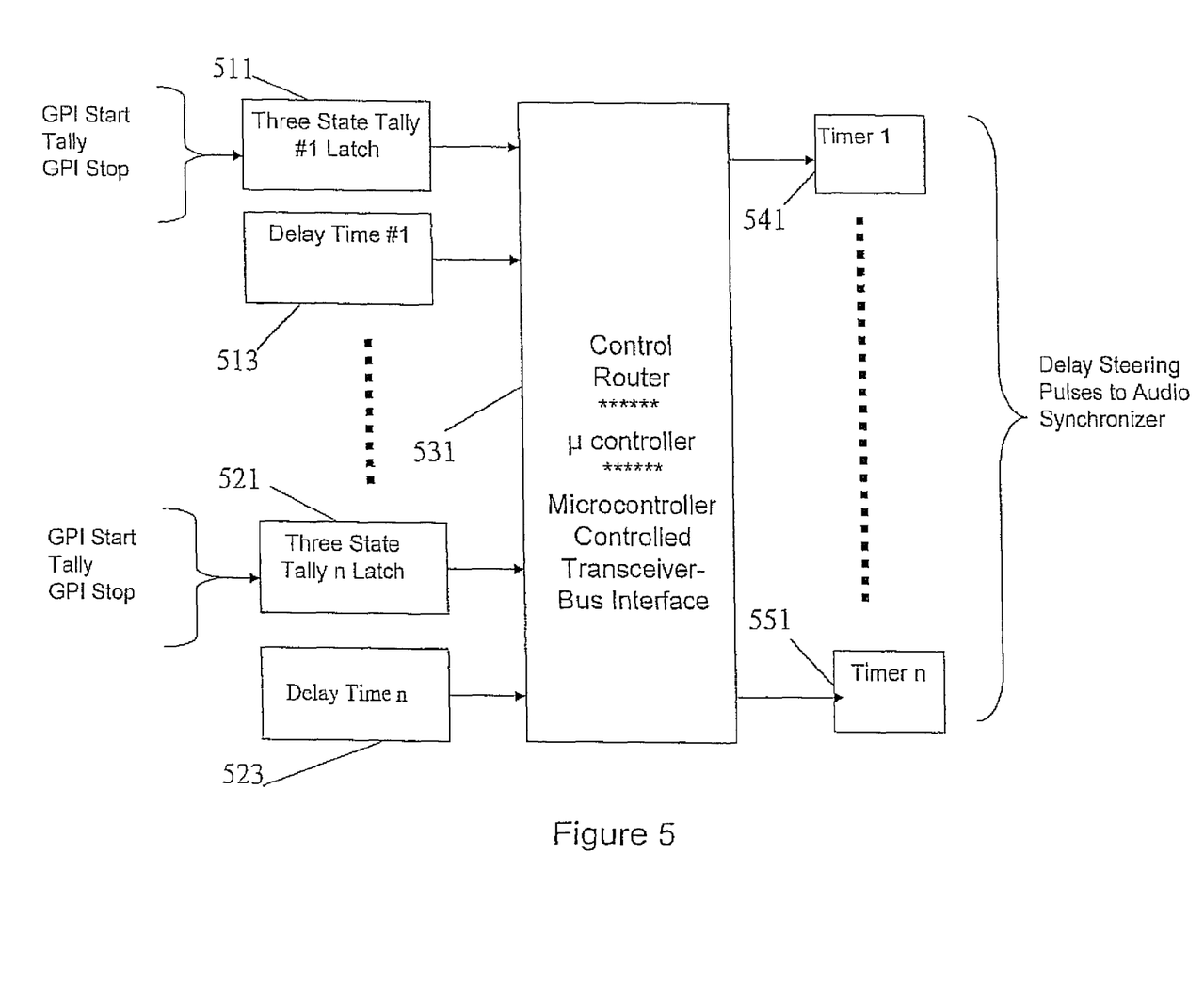
FIG. 5 illustrates a schematic diagram of the preferred embodiment of the present invention having an interface to interpret the GPI and tally outputs and generate the necessary steering commands (preferred to be DDO signals) to control one or more audio synchronizers to permit automatic correction of timing and synchronization errors, such as lip sync errors.

FIG. 5 illustrates a schematic diagram of an interface to interpret the GPI and tally outputs and generate the necessary steering commands to control audio synchronizers to permit automatic correction of timing and synchronization errors, such as lip sync errors.

The system shown in FIG. 5 GPI start signals, Tally signals, and GPI stop signals are input to tally latches 511 and 521. The outputs of the tally latches 511 and 521, and delay time inputs 513 and 523, are timer on/off signals and time values. These are inputs to a control router 531. The control router 531 outputs On/Off and Time signals to individual timers 541 and 551, which in turn generate delay steering pulses to audio synchronizers, not shown.

As shown in FIG. 5 each of the twelve input channels consists of a GPI Start pulse, a GPI Stop pulse, 511 and 521, and a Tally line, 513 and 523. The tally latches 511 and 521 are typically octal transparent, 3 state output latches, such as a 74573 series latches with a common latch enable control, a common 3 state output enable control, 3 state outputs. The latch inputs can be set to operate with Tally only, GPI Start and Stop Triggers only, Tally gated by GPI Start and GPI Stop, as well as delay measure which may be provided by a 7474 flip flop, and/or a 74163 counter which are responsive to the GPI signals. It is preferred however that these functions be implemented with programmable logic configured in response to and operating in conjunction with a microprocessor.

Each input channel also has a linked delay time register 513 and 523 with a user selectable value from 20 μsec (nominally zero delay) up to 6.5 seconds, in increments of 100 μsec. Delay times can be entered and displayed in milliseconds or in TV fields (NTSC or PAL). It is preferred that this function be implemented with programmable logic configured in response to and operating in conjunction with a microprocessor.

Any input channel and its time value can be routed through the control router 531 to any of the output timers 541 and 551 and each timer can steer a separate audio synchronizer, as an AD-3100 Audio Synchronizer. The control router is under microcontroller control. It is preferred that this function be implemented with programmable logic configured in response to and operating in conjunction with a microprocessor. Typically, the microprocessor is at least an eight bit microcontroller with 32 I/O lines, timers, counters, interrupts, priority levels, and an on-chip RAM. One microcontroller useful in the router 531 described herein is an Intel 80C32 microcontroller. The Intel 80C32 microcontroller is an 8 bit microcontroller with 32 I/O lines, 3 timers/counters, 6 interrupts/4 priority less, and 256 bytes of on-chip RAM.

The microprocessor controls a multistate transceiver characterized by a bus interface, three state buffers with three state compatible send and receive directions.

The output timers, 541 and 551, provide TTL level steering pulses to the audio synchronizer to control the delay of the synchronizer. can have different time values and can be turned on and off independently. Also, any timer can be controlled by more than one input channel. Assume that one switcher effect needs a one frame audio delay and another effect needs a two frame audio delay. Input #1 (or any other input) can enable a 1 frame delay in Timer #3 (or any other timer) and the associated audio synchronizer, as an AD-3100. Any other input can be used to enable a 2 frame delay in the same timer. It is preferred that this function be implemented with programmable logic configured in response to and operating in conjunction with a microprocessor.

Program Product

The invention may be implemented, for example, by having the mutual event detection and synchronization as a software application (as an operating system element), a dedicated processor, or a dedicated processor with dedicated code. The software executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for detecting video and audio mutual events, determining the delay, and applying a synchronization delay to the audio and video.

This signal-bearing medium may comprise, for example, memory in server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

The invention claimed is:

1. A method of producing time synchronized audio and video signals assembled from a plurality of selected input audio and video signals comprising:
   receiving an indication of which video input signal has been selected;
   in response to at least one of a plurality of tally signals, generating a timer signal and a video time delay value for the video signal selected; and
   in response to the video time delay value and the timer signal, providing a delay steering input to an audio synchronizer.

2. The method of claim 1 further comprising inputting a start pulse and a stop pulse for each video signal selected.

3. The method of claim 2 further comprising generating a timer signal and a video time delay value for each set of a Start pulse, a Stop pulse and video signal selected.

4. The method of claim 3 further comprising, providing a plurality of timer signals and video time delay values to a router, providing a compromise video time delay value derived from said timer signals and video time delay values, and routing the timer signals and video time delay values as delay steering inputs to an audio synchronizer.

5. The method of claim 1, further comprising:
   a) providing video inputs to a video switcher to provide video output and video time delay steering values;
   b) providing audio inputs and the video time delay steering values to an audio delay;
   and providing corrected audio output.

6. A method of producing time synchronized audio and video signals assembled by selecting from a plurality of different time-synchronized but video time delayed audio and video signal groups, each audio and video signal group having its own input and video timing delay value, comprising:
   a) receiving an indication of which input video signal has been selected;
   b) in response to a tally signal, providing a video timing delay value indicating the video timing delay value of said selected input video signal; and
   c) adjusting the time synchronization of the audio signal that is grouped with the selected input video signal by a time value that is at least partially determined by said video timing delay value of said selected input video signal.

7. The method of claim 6, further using pitch correction to allow the video timing delay value to adjust the time synchronization of the audio signal that is grouped with the selected input video signal, while minimizing undesirable audio artifacts such as pitch shifts.

8. The method of claim 6, in which the inputs for said video signals are GPI and or Tally inputs and signals.

9. The method of claim 6, wherein during said method, at least one video signal is processed by a DVE, and wherein said DVE processing contributes to the video timing delay value of said DVE processed video signal.

10. A method to minimize video time delays between synchronized but video time delayed audio and video signals in audio visual programs assembled from a plurality of different synchronized but video time delayed audio and video signal groups, where each individual synchronized audio and video signal group may have a different video time delay value, the method comprising:
   storing the different video time delay values for each of the individual video signal groups;
   in response to the video signals presently being used to assemble the audio visual program, providing in response a compromise video time delay value from the specific video time delay values associated with the video signal groups that are presently being used to assemble the audio visual program; and
   using this compromise video time delay value to control the audio timing adjustment for the audio signals associated with the video signals presently being used to assemble the audio visual program.

11. The method of claim 10, in which the audio signals associated with the video signal groups presently being used to assemble the audio visual program are produced by an audio mixer which uses the audio signals associated with the video signal groups presently being used to assemble the audio visual program as an input, and produces an audio output;

in which the compromise video time delay value is used to control the audio timing adjustment for the audio output of the audio mixer.

12. The method of claim 11, further using pitch correction to allow the compromise video time delay value to correct the audio output from the audio mixer for changing compromise video time delay values while minimizing undesirable audio artifacts such as pitch shifts.

13. The method of claim 10, further using one or more GPI and or Tally inputs and signals to determine which of the video signals is presently being used to assemble the audio visual program.

14. The method of claim 10, wherein during said method, at least one video signal is processed by a DVE, and wherein said DVE processing contributes to the video timing delay value of said DVE processed signal.

15. The method of claim 10, in which the compromise video time delay value comprises video time delay values in-between the maximum individual video time delay value associated with any of the video signals used to assemble the audio visual program, and the minimum individual video time delay value associated with any of the video signals used to assemble the audio visual program.

16. The method of claim 10, wherein the synchronized audio and video signals are obtained from signal bearing sources selected from the group consisting of television sources, television studio sources, server memory sources, data disc sources, hard drive sources, magnetic tape sources, digital optical sources, RAM sources, ROM sources, EPROM sources, EEPROM sources, Flash memory sources, or other signal bearing media sources.

17. The method of claim 10, wherein at least some of the video time delay values are determined by user entered selections or by using mutual event detection and synchronization software or circuitry.

18. A system to minimize video time delays between synchronized but video time delayed audio and video signals in audio visual programs assembled from a plurality of different synchronized but video time delayed audio and video signal groups, where each individual synchronized audio and video signal group may have a different video time delay value, the system comprising:

a video switcher with inputs for the plurality of video signals, and circuitry or memory to store the different video time delay values for each of the video signal groups;

circuitry or memory to determine which of the video signals is presently being used to assemble the audio visual program; and circuitry or a processor to retrieve the specific video time delay values associated with the video signals that are presently being used to assemble the audio visual program, and derive a compromise video time delay time value from the specific video time delay values;

wherein the system outputs the compromise video time delay value or uses the compromise video time delay value to process audio signals.

19. The system of claim 18, wherein the system additionally comprises an audio mixer that mixes the audio signals associated with the video signals presently being used to assemble the audio visual program, and produces an audio output; and an audio synchronizer that can time adjust the audio output from the audio mixer based upon the compromise video time delay value.

20. The system of claim 19, wherein the audio synchronizer utilizes pitch correction to allow the compromise video time delay value to correct the audio output from the audio mixer for changing compromise video time delay values while minimizing undesirable audio artifacts such as pitch shifts.

21. The system of claim 18, wherein the circuitry or memory to determine which of the video signals is presently being used to assemble the audio visual program comprises one or more GPI and/or Tally inputs and signals.

22. The system of claim 18, wherein the video switcher additionally comprises one or more internal Digital Video Effects processors (DVE).

23. The system of claim 18, wherein the compromise video time delay value comprises video time delay values in-between the maximum individual video time delay value associated with any of the video signals used to assemble the audio visual program, and the minimum individual video time delay value associated with any of the video signals used to assemble the audio visual program.

24. The system of claim 18, wherein the synchronized audio and video signals are obtained from signal bearing sources selected from the group consisting of television sources, television studio sources, server memory sources, data disc sources, hard drive sources, magnetic tape sources, digital optical sources, RAM sources, ROM sources, EPROM sources, EEPROM sources, Flash memory sources, or other signal bearing media sources.

25. The system of claim 18, wherein at least some of the different video time delay values are determined by user entered selections or by mutual event detection and synchronization software or circuitry.

* * * * *